(12) United States Patent
Shinn

(10) Patent No.: US 6,176,445 B1
(45) Date of Patent: Jan. 23, 2001

(54) REPLACEABLE CUTTER TOOTH WITH THREE OUTWARDLY DIVERGING CUTTING TIPS

(76) Inventor: Rickey D. Shinn, P.O. Box 243, Concord, NC (US) 28026

( * ) Notice: Under 35 U.S.C. 154(b), the term of this patent shall be extended for 0 days.

(21) Appl. No.: 09/340,412

(22) Filed: Jun. 28, 1999

(51) Int. Cl.[7] .............................. B02C 18/18; B02C 13/08
(52) U.S. Cl. ............................................................ 241/294
(58) Field of Search ........................ 241/294; 83/698.41, 83/955, 839, 840, 841; 407/34, 40, 42, 48, 413

(56) References Cited

U.S. PATENT DOCUMENTS

| | | |
|---|---|---|
| 3,818,561 | 6/1974 | Montana et al. . |
| 3,937,261 | 2/1976 | Blum . |
| 4,932,447 | 6/1990 | Morin . |
| 4,958,775 | 9/1990 | Arasmith . |
| 5,303,752 | 4/1994 | MacLennan . |
| 5,307,719 | 5/1994 | MacLennan . |
| 5,499,771 | 3/1996 | Esposito et al. . |
| 5,544,826 | 8/1996 | Klingler et al. . |
| 5,655,582 | 8/1997 | Morin . |
| 5,692,689 | 12/1997 | Shinn . |
| 5,873,534 * | 2/1999 | Shinn .................................. 241/294 |

* cited by examiner

*Primary Examiner*—Mark Rosenbaum
(74) *Attorney, Agent, or Firm*—Adams, Schwartz & Evans, P.A.

(57) ABSTRACT

A cutter tooth is carried on an outer peripheral surface of a rotatable cutter adapted for clearing, mulching and grinding trees. The cutter tooth includes a tooth body with a front face, sides, and a rear. The face is recessed inwardly and defines three equally spaced-apart and outwardly diverging cutting tips.

19 Claims, 4 Drawing Sheets

REPLACEABLE CUTTER TOOTH WITH THREE OUTWARDLY DIVERGING CUTTING TIPS

TECHNICAL FIELD AND BACKGROUND OF INVENTION

This invention relates to a replaceable cutter tooth having three outwardly diverging cutting tips. The invention is particularly adapted use in combination with a tooth holder assembly mounted to the outer peripheral surface of a rotatable cutter drum used for clearing, mulching, and grinding trees. The cutter drum is movably mounted on the boom of a backhoe. During operation of the cutter drum, the teeth become worn or damaged and must be periodically replaced. A complete description of Applicant's cutter drum is provided in U.S. Pat. Nos. 5,692,689 and 5,794,866. This description is incorporated herein by reference.

One problem in the art which is addressed by a third patent issued to the present applicant, U.S. Pat. No. 5,873,534, relates to damage and wear of cutter teeth over a relatively short period of use, and the overall performance of the cutter teeth in terms of cutting and mulching trees. This patent describes a four-tipped cutter tooth which mounts to the outer surface of the cutter drum such that three of the four tips reside in a cutting or mulching position spaced apart from the drum surface, while one of the cutting tips fits within a groove formed in a tooth holder assembly used to secure to the tooth to the drum. When the cutting tip in the outermost cutting position becomes worn, the cutter tooth is rotated 180 degrees so that the fresh tip once positioned in the groove is now located in the cutting position. This combination cutter tooth and tooth holder assembly overcame many drawbacks and limitations in the prior art relating to the replacement, useful life, and performance of cutter teeth.

The present invention further improves this combination by providing a three-tipped cutter tooth and tooth holder assembly which mounts to the outer surface of the cutter drum. During operation of the cutter drum, two of the three cutting tips reside in a reduced wear position adjacent the tooth holder assembly, while only a single tooth resides in an increased wear position for cutting and mulching. When the cutting tip in the cutting position becomes worn, the cutter tooth is rotated so that one of the two fresh tips takes its place. According to this design, less energy is required to operate the drum, since less surface area of the tooth actually engages and penetrates the tree during cutting. Moreover, the reduced surface area of the tooth in the cutting position results in less drag force acting against rotation of the drum.

SUMMARY OF THE INVENTION

Therefore, it is an object of the invention to provide a cutter tooth which includes only three equally-spaced cutter tips.

It is another object of the invention to provide a cutter tooth which is readily removed and replaced when worn.

It is another object of the invention to provide a three-tipped cutter tooth which mounts to the outer surface of a cutter drum such that one of the cutting tips resides in a cutting position, while the remaining two cutting tips reside in a reduced wear position.

It is another object of the invention to provide a three-tipped cutter tooth which results in less drag force acting against rotation of the cutter drum during tree cutting and mulching.

It is another object of the invention to provide a three-tipped cutter tooth which is oriented relative to the outer surface of the cutter drum to expose only a relatively small surface area of the tooth for engaging and penetrating trees during operation of the cutter drum.

It is another object of the invention to provide a tooth holder assembly which securely holds and supports the cutter tooth in position during operation of the cutter drum.

It is another object of the invention to provide a cutter tooth holder assembly which allows indexing of the cutter tooth to locate a fresh cutting tip in the cutting position when the old tip becomes worn.

It is another object of the invention to provide a tooth holder assembly which helps reduce the occurrence of tooth breakage during operation of the cutter drum.

It is another object of the invention to provide a combination tooth holder assembly and cutter tooth adapted for attachment to a cutter drum for producing a fine-cut mulch.

It is another object of the invention to provide a combination tooth holder assembly, cutter tooth, and cutter drum which effectively clears and mulches trees.

These and other objects of the present invention are achieved in the preferred embodiments disclosed below by providing a cutter tooth for being carried on an outer peripheral surface of a rotatable cutter adapted for mulching and grinding trees. The cutter tooth includes a tooth body with a front face, sides, and a rear. The face is recessed inwardly and defines three equally spaced-apart and outwardly diverging cutting tips.

According to one preferred embodiment of the invention, each of the cutting tips has a generally triangular cutting surface defined by intersecting side edges.

According to yet another preferred embodiment of the invention, the side edges defining each of the cutting surfaces diverge from each other at an angle of approximately 60 degrees.

According to yet another preferred embodiment of the invention, the tooth body further includes a cylindrical connector portion extending outwardly from its rear, and adapted for being received in a complementary-shaped annular cavity formed in a tooth holder mounted to the outer peripheral surface of the cutter.

According to yet another preferred embodiment of the invention, an internally-threaded opening is formed centrally through the tooth body, and is adapted for receiving a complementary-threaded fastener for attaching the cutter tooth to the cutter.

In another embodiment, the invention includes a cutter tooth holder assembly adapted for being mounted to an outer peripheral surface of a rotatable cutter. A cutter tooth is attached to the tooth holder assembly. The cutter tooth includes a tooth body having a front face, sides, and a rear. The face is recessed inwardly and defines three equally spaced-apart and outwardly diverging cutting tips.

According to one preferred embodiment of the invention, the tooth holder assembly includes a base having a circumferentially-extending bottom surface for engaging the outer peripheral surface of the cutter and a tooth-protecting groove formed in its top surface. The cutter tooth is arranged such that two of the cutting tips reside within the tooth-protecting groove in a reduced-wear position, while the third one of the cutting tips resides in an outward-extending cutting position relative to the outer surface of the cutter.

According to another preferred embodiment of the invention, the cutter tooth holder assembly further includes an elongate tooth holder formed adjacent the tooth-protecting and having a generally triangular front bearing surface engaging the rear of the cutter tooth.

According to yet another preferred embodiment of the invention, the tooth holder has a length greater than two times the length of the cutter tooth.

According to yet another preferred embodiment of the invention, the tooth holder and base are integrally formed together.

According to yet another preferred embodiment of the invention, the tooth body further includes a cylindrical connector portion extending outwardly from its rear. The tooth holder assembly includes an elongate tooth holder having a complementary-shaped annular cavity receiving the connector portion of the tooth.

According to yet another preferred embodiment of the invention, the tooth holder includes a longitudinal opening formed therethrough and extending from one end of the tooth holder to the other.

According to yet another preferred embodiment of the invention, the connector portion of the cutter tooth includes an internally-threaded opening formed in axial alignment with the longitudinal opening through the tooth holder. An elongate bolt extends through the opening in the tooth holder and has an external screw thread adapted for mating with the internal screw thread of the cutter tooth to removably attach the cutter tooth to the tooth holder assembly.

According to yet another preferred embodiment of the invention, the tooth holder assembly includes an elongate tooth holder having a generally triangular bearing surface defining respective corners arranged in substantial alignment with the tips of the cutter tooth.

In yet another embodiment, the invention includes a rotatable cutter and a tooth holder assembly mounted to an outer peripheral surface of the cutter. A cutter tooth is attached to the tooth holder assembly, and includes a tooth body having a front face, sides, and a rear. The face is recessed inwardly and defines three equally spaced-apart and outwardly diverging cutting tips.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED
EMBODIMENT AND BEST MODE

Figure 1:
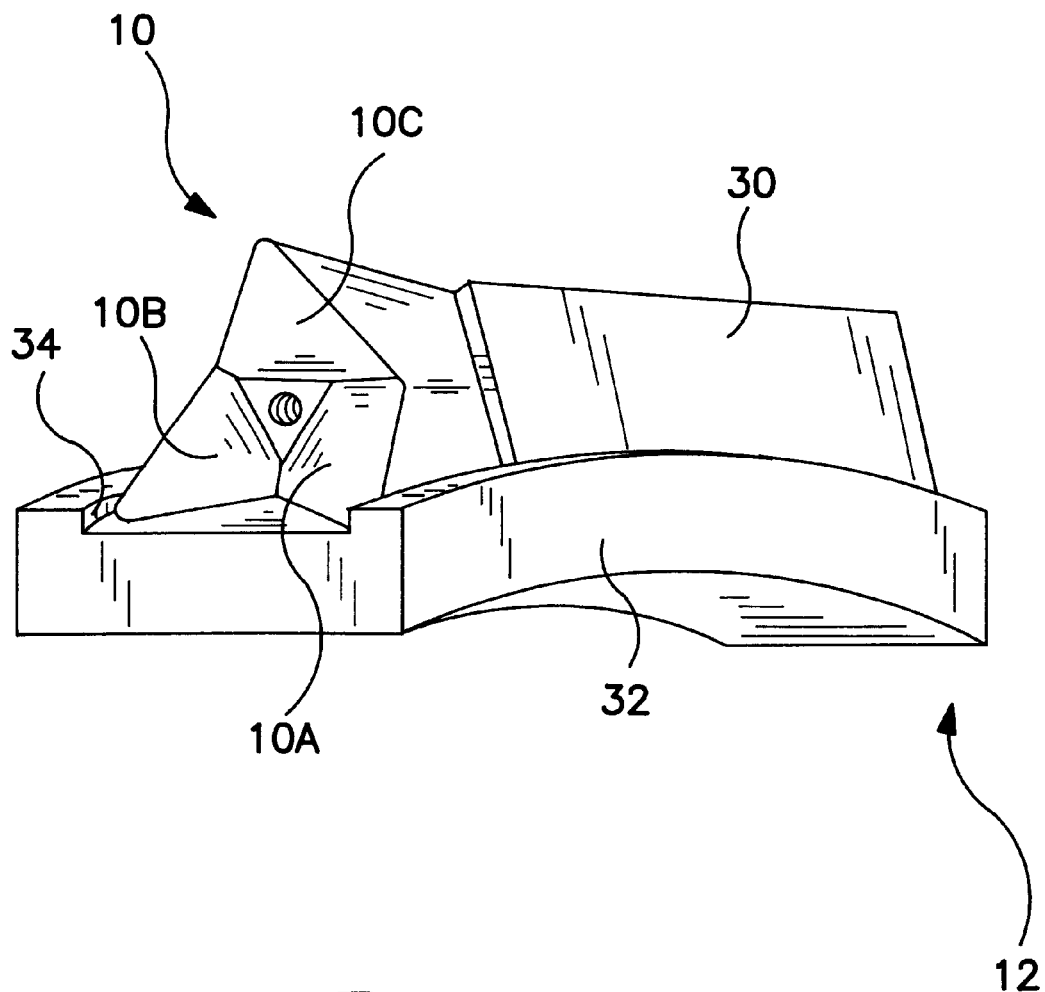
FIG. 1 is a perspective view of the cutter tooth and tooth holder assembly according to one preferred embodiment of the present invention.
Figure 2:
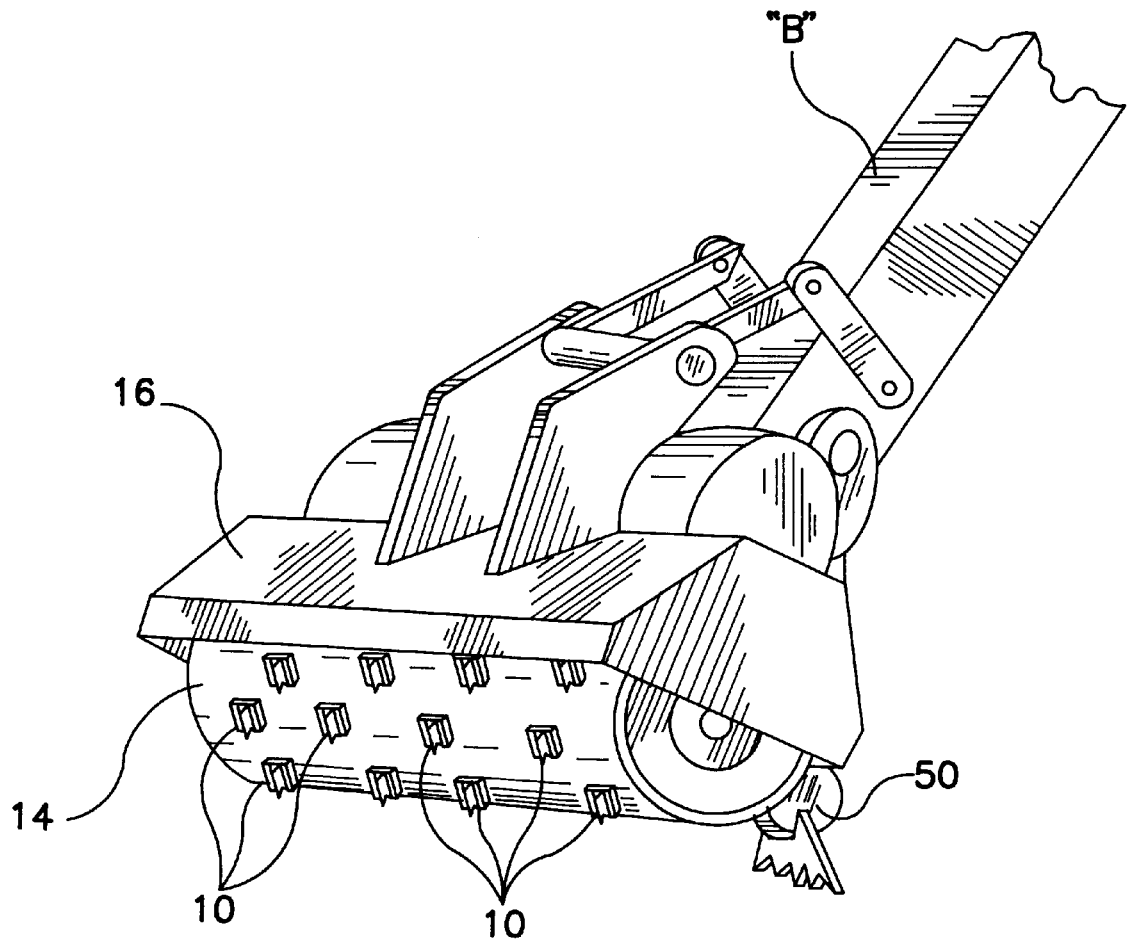
FIG. 2 is a perspective view of a rotatable cutter drum mounted to the boom of a backhoe, and showing a number of replaceable cutter teeth attached to the outer peripheral surface of the drum.

Referring now specifically to the drawings, a replaceable cutter tooth according to the present invention is illustrated in FIG. 1 and shown generally at reference numeral 10. The cutter tooth 10 is carried by a tooth holder assembly 12 specially adapted for mounting to the outer peripheral surface of a cutter drum 14, such as that shown in FIG. 2, used for clearing, mulching, and grinding trees. The cutter drum 14 is movably mounted on the boom "B" of a backhoe (not shown), and includes a drum shield 16 for containing the deflection of wood debris during cutting and mulching.

Figure 3:
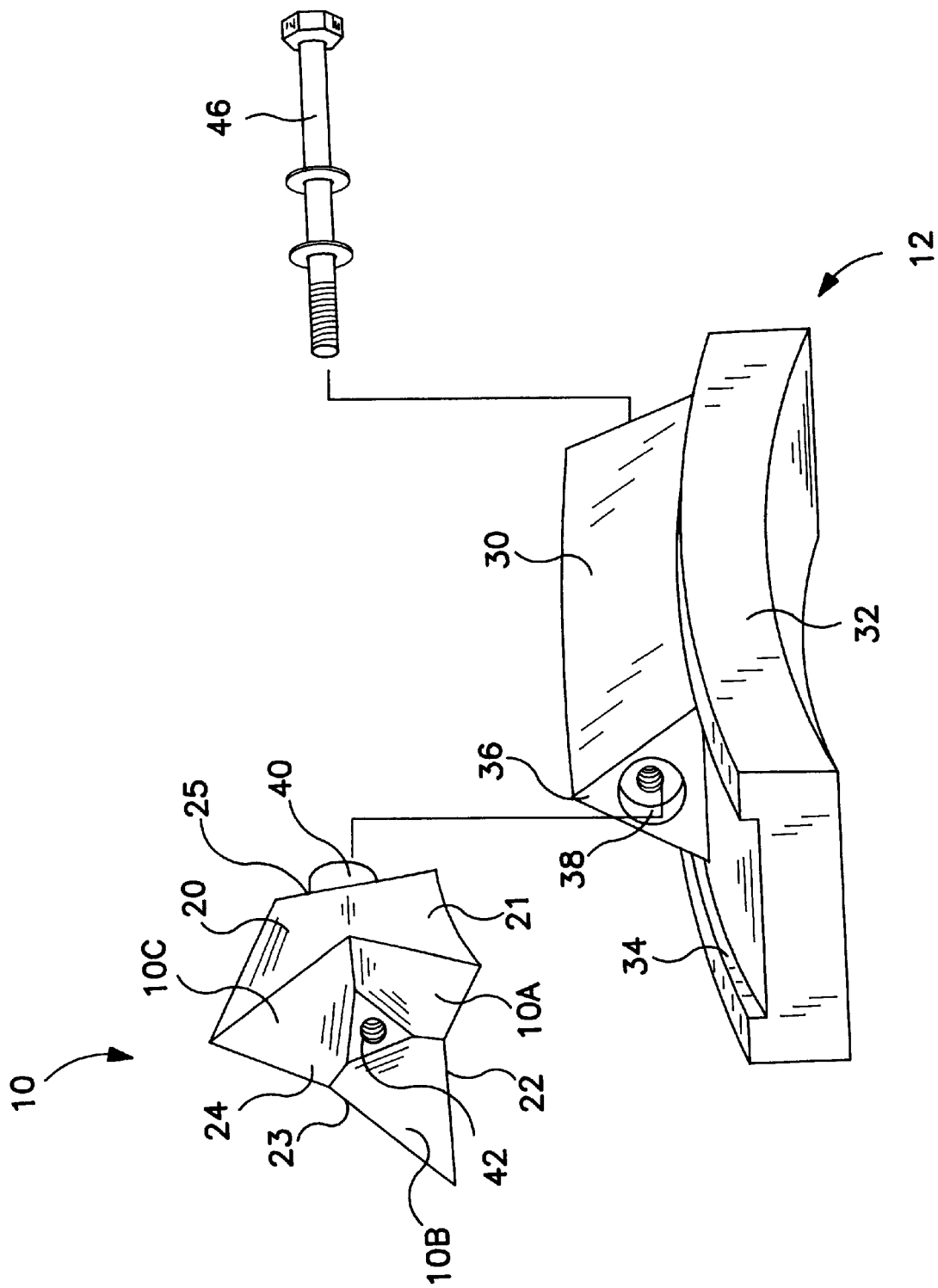
FIG. 3 is perspective view of the cutter tooth and tooth holder assembly with cutter tooth removed from its in-use position adjacent the bearing surface of the tooth holder.

Referring to FIGS. 1 and 3, the cutter tooth 10 includes a tooth body 20, flat sides 21, 22, and 23, a front face 24, and rear 25. The face 24 of the tooth 10 is recessed inwardly and defines three equally spaced, outwardly-extending cutting tips 10A, 10B, and 10C. Each of the cutting tips 10A–10C has a generally triangular cutting surface formed by respective pairs of intersecting side edges. Preferably, the side edges of each pair diverge from each other at an angle of approximately 60 degrees and extend inwardly in a direction towards the rear 25 of the tooth 10. Because the cutting tips 10A–10C are subject to wear over a period of use, the cutter tooth 10 must be periodically rotated, and ultimately removed and replaced when completely worn.

Figure 4:
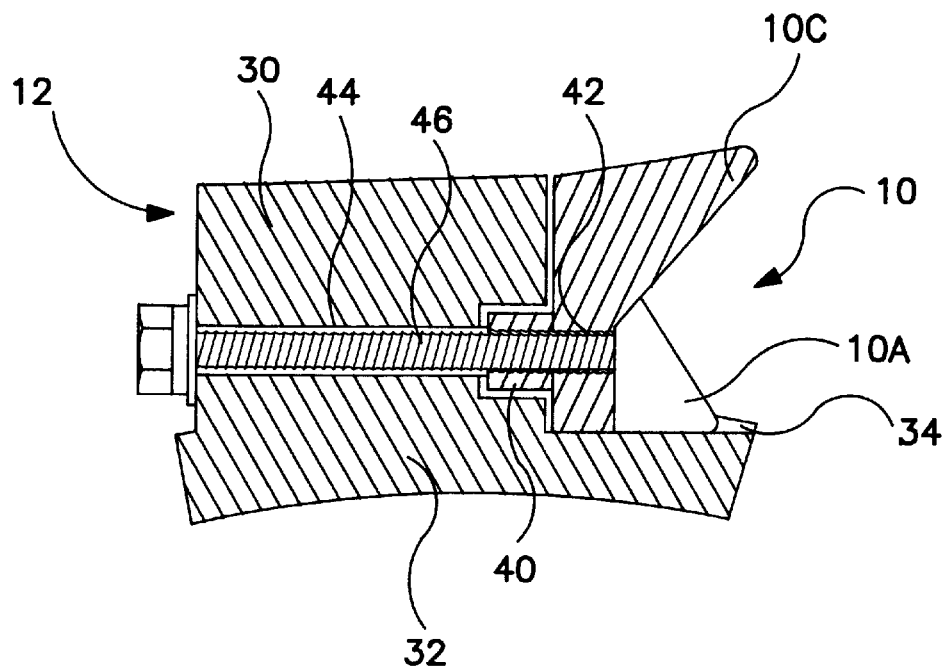
FIG. 4 is a cross-sectional view of the cutter tooth and tooth holder assembly taken substantially along line 4—4 of FIG. 5.
Figure 5:
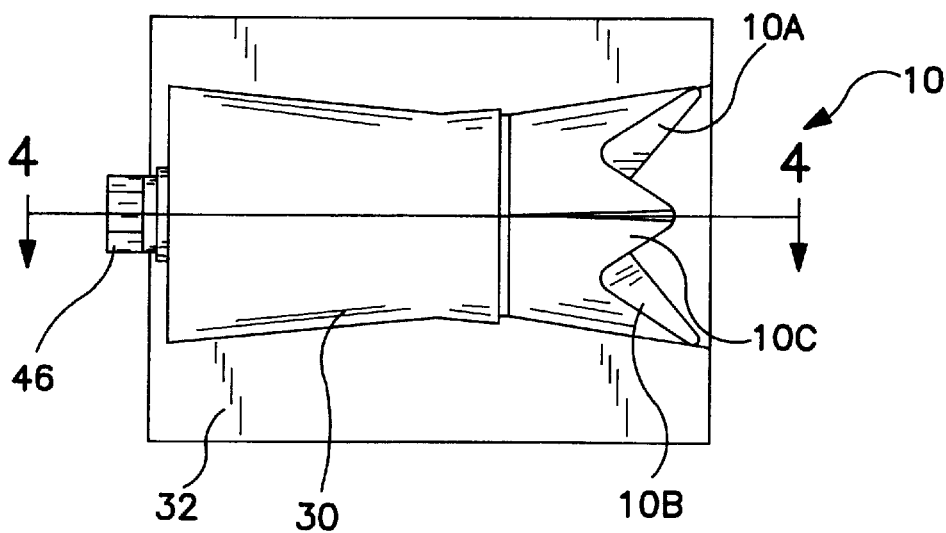
FIG. 5 is a top plan view of the cutter tooth and tooth holder assembly.

The tooth holder assembly 12 includes an elongate tooth holder 30 and base 32 integrally formed together and welded to the outer peripheral surface of the cutter drum 14. The base 32 has a circumferentially-extending bottom surface for engaging the drum 14, and a top surface with a tooth-protecting groove 34 extending from a front edge of the base 32 to the tooth holder 30. The tooth holder 30 is integrally formed adjacent the tooth-protecting groove 34, and has a generally triangular bearing surface 36 with an annular center cavity 38 adapted for receiving a cylindrical connector portion 40 of the cutter tooth 12. As shown in FIG. 4, the connector portion 28 has an internally-threaded opening 42 which is arranged in axial alignment with a longitudinal bolt opening 44 extending through the tooth holder 30. A conventional bolt 46 is received through the bolt opening 44 and into the threaded opening 42 of the cutter tooth 10. The bolt 46 has a complementary external screw thread which mates with the internal thread of the opening 42 to removably attach the cutter tooth 10 to the tooth holder assembly 12.

The cutter tooth 10 is oriented such that two of its three cutting tips 10A and 10B reside in the tooth-protecting groove 34 in a reduced wear position, while a third one of its cutting tips 10C resides in a cutting position relative to the outer surface of the drum 14. The flat side 22 of the tooth 10 engaging the base 32 within the tooth-protecting groove 34 provides sufficient stability to prevent rotational movement of the tooth 10 during operation of the cutter drum 14. The corners defined by the bearing surface 36 of the tooth holder 30 are arranged in substantial alignment with the tips 10A–10C of the cutter tooth 10 such that, upon impact of the cutter tooth 10 and tree, the bearing surface 36 transfers this energy directly to the rotating cutter drum 14. This reduces the occurrence of tooth breakage and other damage to the tooth 10 and tooth holder assembly 12 during operation of the cutter drum 14.

When the tip 10C of the cutter tooth 10 begins to wear, the tooth 10 is re-oriented such that a fresh tip 10A resides in the cutting position, while the worn tip 10C is moved to the reduced wear position within the tooth-protecting groove 34. When all of the tips 10A–10C are worn, the cutter tooth 10 is replaced by removing the bolt 46 and adding a new tooth.

According to one embodiment of the invention, the length of the tooth holder 30 is about 3 inches, and the length of the cutter tooth 10 as measured from one of its cutting tips 10A–10C to its rear 25 is about 1½ inches. Each tooth 10 is indexed to expose a single tip 10A–10C in the cutting position, thereby minimizing drag on the rotating cutter drum 14 during operation. In addition, because the cutting surface of only a single cutting tip 10A–10C engages and penetrates the tree, higher drum speed can be achieve with less energy required for rotating the drum 14 during cutting and mulching.

Referring again to FIG. 2, the cutter teeth 10 are preferably attached to the periphery of the drum 14 in ten (10) circumferentially-spaced rows with four (4) teeth 10 per row. As the drum 14 rotates, the first row contacts the tree first. The second row then contacts the tree at a point about 1⅝ inches to the left of the first row. The third row then hits at about 1⅝ inches to the right of first row. The forth row hits at about 3¼ inches to the left of first row, and the fifth row hit at about 3¼ inches to the right of first row through 180° of the drum circumference. The next 5 rows have the same pattern except that they are shifted about ¹³⁄₁₆ths inches to the right of the first row. This tooth pattern helps produce a complete, fine-cut mulch.

According to one technique of cutting trees using the cutter drum 14, the backhoe operator maneuvers the boom "B" such that an outward projecting thumb 50 adjacent the cutter drum 14 engages the tree at a point above the ground to push the tree in a direction away from the backhoe. With the thumb 50 engaged, the cutter drum 14 pivots on the end of the boom "B" to move the cutter teeth 10 of the rotating drum 14 into engagement with the tree. As the teeth 10 cut through the tree, gravity causes the cut portion of the tree to fall safely away from the backhoe in the direction of force applied by the thumb 50. The remaining trunk of the tree is then ground away by moving the cutter drum 14 downwardly over the top of the trunk to the ground surface.

A cutter tooth, tooth holder assembly, and cutter drum are described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. A cutter tooth for being carried on an outer peripheral surface of a rotatable cutter adapted for clearing, mulching, and grinding trees, said cutter tooth comprising a tooth body having a front face, sides, and a rear, said face being recessed inwardly and defining three equally spaced-apart and outwardly diverging cutting tips, and said cutter tooth adapted for being oriented relative to the rotatable cutter such that two of said three cutting tips reside in a reduced wear position while a third of said three cutting tips resides in a cutting position for engaging and cutting trees.

2. A cutter tooth according to claim 1, wherein each of said cutting tips has a generally triangular cutting surface defined by intersecting side edges.

3. A cutter tooth according to claim 2, wherein the side edges defining each of said cutting surfaces diverge from each other at an angle of approximately 60 degrees.

4. A cutter tooth according to claim 1, wherein said tooth body further comprises a cylindrical connector portion extending outwardly from the rear thereof, and adapted for being received in a complementary-shaped annular cavity formed in a tooth holder mounted to the outer peripheral surface of the cutter.

5. A cutter tooth according to claim 1, and comprising an internally-threaded opening formed centrally through said tooth body and adapted for receiving a complementary-threaded fastener for attaching said cutter tooth to the cutter.

6. In combination with a cutter tooth holder assembly adapted for being mounted to an outer peripheral surface of a rotatable cutter, the improvement comprising a cutter tooth attached to said tooth holder assembly, said cutter tooth comprising a tooth body having a front face, sides, and a rear, said face being recessed inwardly and defining three equally spaced-apart and outwardly diverging cutting tips, and said cutter tooth adapted for being oriented relative to the rotatable cutter such that two of said three cutting tips reside in a reduced wear position while a third of said three cutting tips resides in a cutting position for engaging and cutting trees.

7. A combination according to claim 6, wherein said cutter tooth holder assembly comprises a base having a circumferentially-extending bottom surface for engaging the outer peripheral surface of the cutter and a tooth-protecting groove formed in a top surface thereof, and wherein said cutter tooth is arranged such that two of said cutting tips reside within said tooth-protecting groove in a reduced-wear position, while the third one of said cutting tips resides in an outward-extending cutting position relative to the outer surface of the cutter.

8. A combination according to claim 7, wherein said cutter tooth holder assembly further comprises an elongate tooth holder formed adjacent the tooth-protecting groove and having a front bearing surface engaging the rear of said cutter tooth.

9. A combination according to claim 8, wherein said tooth holder has a length greater than two times the length of said cutter tooth.

10. A combination according to claim 8, wherein said tooth holder and base are integrally formed together.

11. A combination according to claim 6, wherein said tooth body further comprises a cylindrical connector portion extending outwardly from the rear thereof, and wherein said tooth holder assembly comprises an elongate tooth holder having a complementary-shaped annular cavity receiving the connector portion of said tooth.

12. A combination according to claim 11, wherein said tooth holder includes a longitudinal opening formed therethrough and extending from one end of the tooth holder to the other.

13. A combination according to claim 12, wherein the connector portion of said cutter tooth includes an internally-threaded opening formed in axial alignment with the longitudinal opening through said tooth holder, and wherein an elongate bolt extends through the opening in said tooth holder and has an external screw thread adapted for mating with the internal screw thread of said cutter tooth to removably attach said cutter tooth to the tooth holder assembly.

14. A combination according to claim 6, wherein said tooth holder assembly comprises an elongate tooth holder having a generally triangular bearing surface defining respective corners arranged in substantial alignment with the tips of said cutter tooth.

15. A combination according to claim 6, wherein each of said cutting tips has a generally triangular cutting surface defined by intersecting side edges.

16. A combination according to claim 15, wherein the side edges defining each of said cutting surfaces diverge from each other at an angle of approximately 60 degrees.

17. In combination with a rotatable cutter and a tooth holder assembly mounted to an outer peripheral surface of said cutter, the improvement comprising a cutter tooth attached to said tooth holder assembly, said cutter tooth comprising a tooth body having a front face, sides, and a rear, said face being recessed inwardly and defining three equally spaced-apart and outwardly diverging cutting tips, and said cutter tooth adapted for being oriented relative to the rotatable cutter such that two of said three cutting tips reside in a reduced wear position while a third of said three cutting tips resides in a cutting position for engaging and cutting trees.

18. A combination according to claim 17, wherein each of said cutting tips has a generally triangular cutting surface defined by intersecting side edges.

19. A combination according to claim 18, wherein the side edges defining each of said cutting surfaces diverge from each other at an angle of approximately 60 degrees.

\* \* \* \* \*